(No Model.)
G. S. AXFORD.
IMPLEMENT FOR ATTACHING CROSS WIRES TO FENCES.
No. 540,417. Patented June 4, 1895.
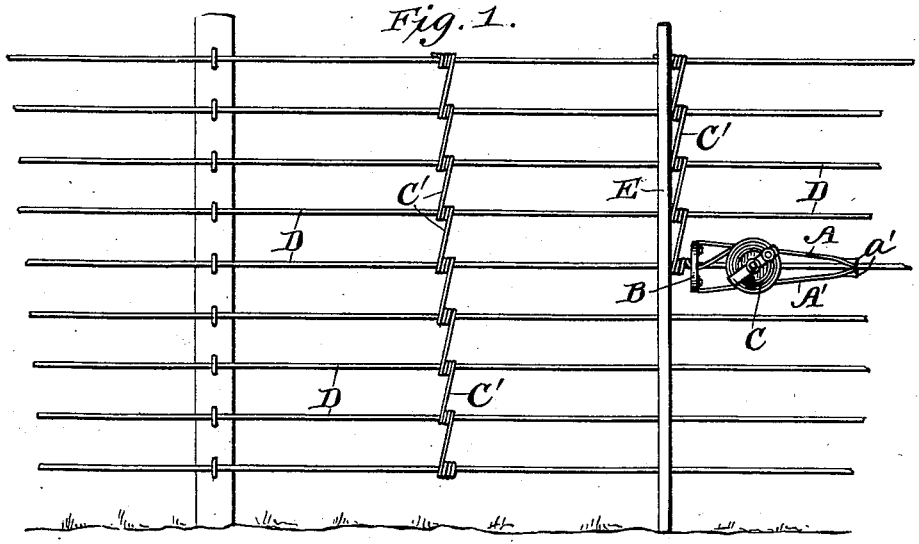
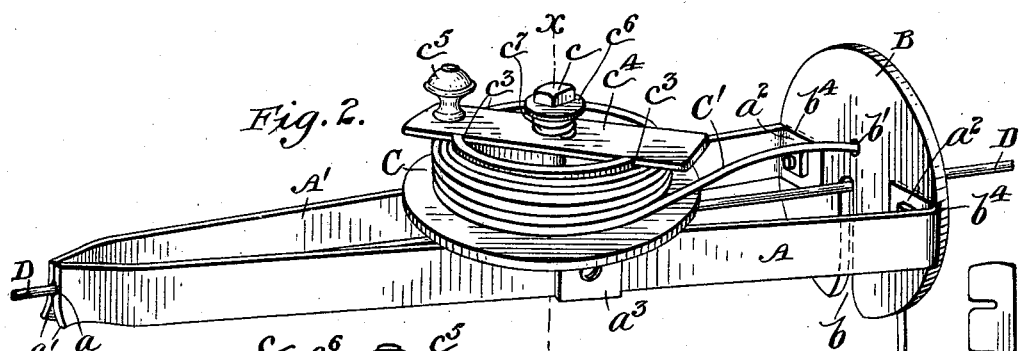
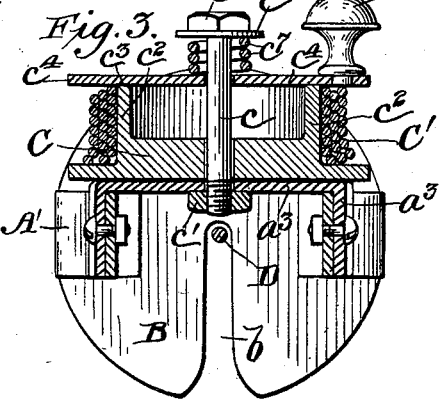
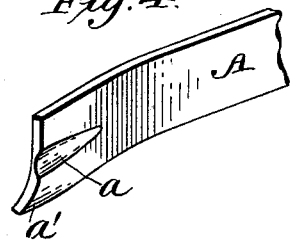
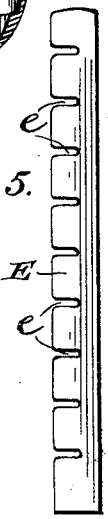
WITNESSES
INVENTOR

UNITED STATES PATENT OFFICE.

GEORGE S. AXFORD, OF ROCHESTER, MICHIGAN.

IMPLEMENT FOR ATTACHING CROSS-WIRES TO FENCES.

SPECIFICATION forming part of Letters Patent No. 540,417, dated June 4, 1895.

Application filed March 28, 1895. Serial No. 543,508. (No model.)

*To all whom it may concern:*

Be it known that I, GEORGE S. AXFORD, a citizen of the United States, residing at Rochester, in the county of Oakland and State of Michigan, have invented certain new and useful Improvements in Tools or Implements for Attaching Cross-Wires to Fences; and I do hereby declare the following to be a full, clear, and exact description of the invention, such as will enable others skilled in the art to which it appertains to make and use the same.

My invention relates to improvements in tools or implements for winding or attaching the cross or brace wires to wire fences.

The invention consists of the combination of a spring frame adapted to clamp itself in position on the fence wire with spring pressure, a slotted disk mounted on said frame and adapted to engage said wire and a wire reel on said frame to supply wire to the said slotted disk to wind upon the main wire.

It also consists of the combination of a frame adapted to clamp itself in position on the fence wire, a slotted disk mounted on said frame and adapted to engage said wire, a wire reel on said frame, adjustable tension devices for said reel, and means for rotating the same to refill it with wire when needed.

It also consists of certain other novel constructions, combinations and arrangements of parts, all of which will be hereinafter more particularly set forth and claimed.

In the accompanying drawings, forming part of this specification, Figure 1 represents a side elevation of a portion of a wire fence, showing my implement as applied thereto when twisting on the cross-wire. Fig. 2 represents a perspective view of said implement. Fig. 3 represents a transverse section through said implement on the line $x$ $x$ of Fig. 2. Fig. 4 is a detail view of the grooved end of one of the spring-arms, and Fig. 5 represents a side elevation of a spacing-bar for use with my implement.

A A' in the drawings represent the spring arms forming a V shaped frame, B the slotted winding disk attached to said arms, and C the wire reel also mounted on said arms. The said arms A A' are each provided on their inner sides at one end with a short longitudinal groove $a$ and have said ends flared on one edge at $a'$. See Fig. 4. When said arms are together the grooves $a$ coincide in position and form a circular passage through which the main longitudinal wire of a fence passes when the implement is applied thereto. The opposite ends of said arms are bent inward as at $a^2$ and attached to the disk B which is provided with a countersunk recess $b^4$ to receive said ends. This disk is provided with a radial flaring mouth slot $b$ extending from the center of said disk to its periphery and at right angles to the wire D. The said disk is also provided with an aperture $b'$ through which the wire C' from the reel passes as it is being wound around the main wire D. The said arms A A' are connected by a lateral brace $a^3$ which has its ends bent at right angles so as to lie flat against the sides of said arms to be bolted thereto. The reel C is rotatably mounted on this brace by means of a bolt $c$ which passes through both the brace and the reel and is provided on its end with a securing nut $c'$.

The reel consists of a flat disk having a hollow hub $c^2$ formed on one side thereof and upon which the wire is wound. The outer periphery of the hub is provided with two shallow slots $c^3$ adapted to receive the crank plate $c^4$ which is provided at one end with an operating handle $c^5$. The ends of said plate project beyond the edges of the hub $c^2$ and thus form projections for retaining the wire on said hub $c^2$. The bolt $c$ passes through this plate $c^4$ and is provided with a washer $c^6$ bearing against the head of the bolt and a coil spring $c^7$ interposed between the said washer and the top of the plate $c^2$. It will be seen from the foregoing that the plate and consequently the reel are held against the brace $a^3$ under spring tension and thus the revolution of the reel is under spring tension. This tension can be increased or decreased by tightening or loosening the nut $c'$. I use a spacing bar E having notches $e$ cut therein for holding the wires the desired distance apart when the cross wires are being applied.

In operating the implement the spacer shown in Fig. 5 is first applied to the wires to hold them the desired distance apart while having the cross wires wound thereon. The grooved ends of the arms A A' are then sprung over the top wire D, and the disk B also slipped on said wire the latter passing into the slot *b*. The end of the wire on the reel is then passed through the aperture *b'* and secured in the end of the spacer. The implement is now revolved, winding the cross wire tightly about the top wire D. When the desired number of turns are given to said wire the implement is sprung off the top wire D and taken downward to the next wire where the operation is repeated, and so on for each wire of the fence. As this operation is in progress the wire is unwinding all the time from the reel under the proper tension. When the reel is empty the end of the wire from a supply reel is passed through the aperture *b'* and attached to an aperture in the reel and the reel rotated by its operating handle until full.

Having now described my invention, what I claim as new, and desire to secure by Letters Patent, is—

1. In a fence implement, the combination of a spring frame adapted to clamp itself into position on the fence wire with spring pressure, a slotted disk mounted on said frame and adapted to engage said wire, and a wire reel on said frame to supply wire to the said slotted disk to wind upon the main wire, substantially as described.

2. In a fence implement, the combination of a frame adapted to clamp itself into position on the fence wire, a slotted disk mounted on said frame and adapted to engage said wire, a wire reel on said frame, and an adjustable tension device for said reel, substantially as described.

3. In a fence implement, the combination of a spring frame adapted to clamp itself in position on the fence wire with spring pressure, a slotted disk mounted on said frame and adapted to engage said wire, a wire reel on said frame, an adjustable tension device for said reel, and an operating handle for rotating said reel to refill it with wire when needed, substantially as described.

4. In a fence machine, the combination of a frame adapted to clamp itself on the fence wire, a slotted disk mounted on said frame and adapted to engage said wire, a reel rotatably mounted on said frame, a bolt passing through said frame and reel, a plate engaging said reel, and a spiral spring mounted on said bolt and engaging said plate to keep said reel under tension, substantially as described.

5. In a fence implement, the combination of a spring V-shaped frame composed of connected spring arms having grooved and flared ends adapted to be sprung over the fence wire, a slotted and apertured disk mounted on said frame, a rotatable wire reel on said frame; the wire from the same adapted to pass through the aperture in the disk, substantially as described.

In testimony whereof I hereunto affix my signature in presence of two witnesses.

GEORGE S. AXFORD.

Witnesses:
CRAMER SMITH,
W. A. TAYLOR.